Nov. 6, 1962 E. A. BRASS 3,062,073
TWO-STAGE SPLIT-POWER REDUCTION GEAR
Filed Nov. 14, 1960 3 Sheets-Sheet 1

INVENTOR.
EDWARD A. BRASS.
BY
ATTORNEYS.

Nov. 6, 1962 E. A. BRASS 3,062,073
TWO-STAGE SPLIT-POWER REDUCTION GEAR
Filed Nov. 14, 1960 3 Sheets-Sheet 2

INVENTOR.
EDWARD A. BRASS.
BY
ATTORNEYS.

Nov. 6, 1962  E. A. BRASS  3,062,073
TWO-STAGE SPLIT-POWER REDUCTION GEAR
Filed Nov. 14, 1960  3 Sheets-Sheet 3
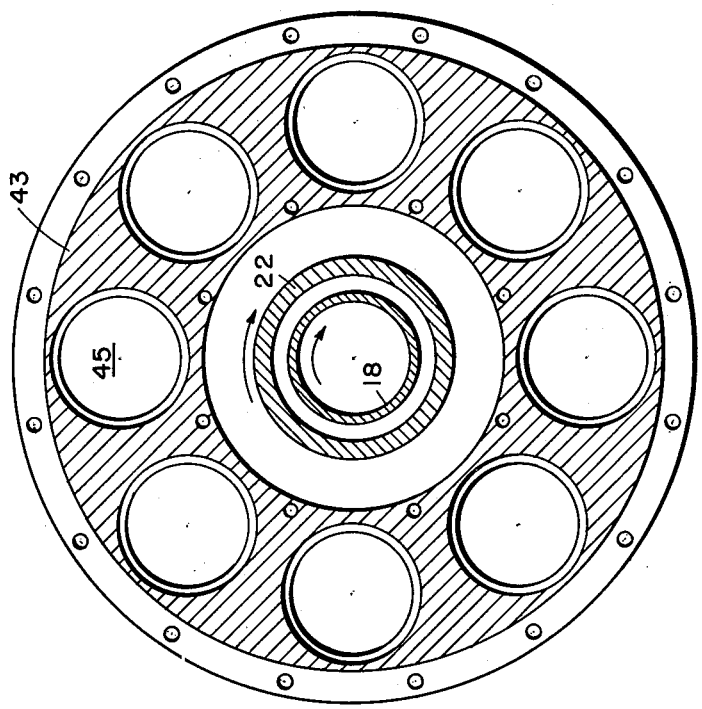
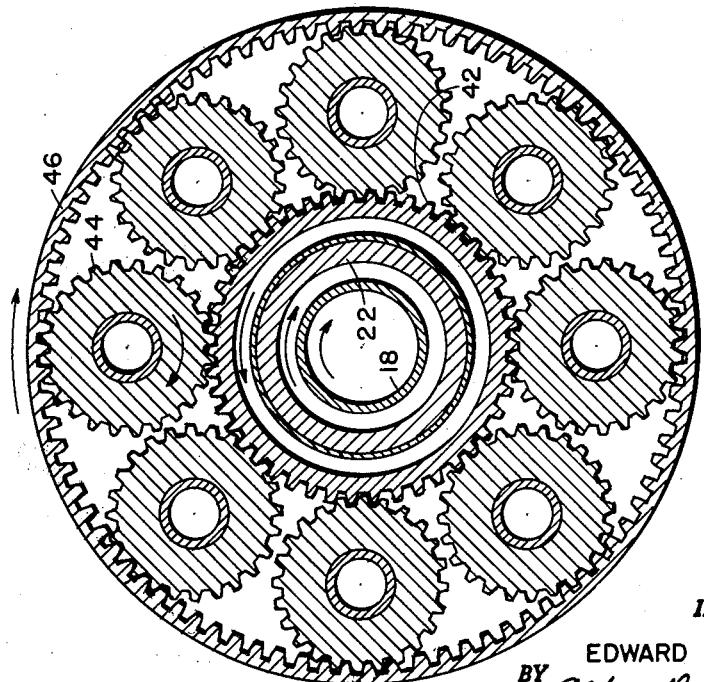
INVENTOR.
EDWARD A. BRASS.
BY
ATTORNEYS.

:

United States Patent Office 3,062,073
Patented Nov. 6, 1962

---

3,062,073
TWO-STAGE SPLIT-POWER REDUCTION GEAR
Edward A. Brass, Norwalk, Conn., assignor to Avco Corporation, Stratford, Conn., a corporation of Delaware
Filed Nov. 14, 1960, Ser. No. 69,064
7 Claims. (Cl. 74—674)

This invention relates to a two gear-set stage split-power reduction gear particularly adapted for use as a turboprop gear reduction for use with a gas turbine engine.

The marked advantages in the use of a gas turbine engine in the small, 500 to 3,000, horse power class is its ability to develop 4 or 5 H.P. for one pound of basic engine weight and the application of such an engine to propeller driven aircraft makes it important to attempt to maintain this weight reduction by also providing a gear reduction of the required speed ratio with a gear assembly of minimum weight.

So-called small gas turbines in the horsepower range of approximately 500 H.P. to 3,000 H.P. to operate efficiently must have high rotor speeds. Generally, the smaller the horsepower class the higher is the rotor speed. For example, a 2,000 H.P. gas turbine will operate at about 12,000 r.p.m., a 1,000 H.P. engine at about 20,000 r.p.m., and a 500 H.P. engine at about 30,000 r.p.m. On the other hand, the trend in propeller design is toward larger and hence lower speed propellers, particularly in so-called VTOL and STOL aircraft. This then results in speed ratio requirements of 15 to 1 and higher for small turboprop engines.

It is an important requirement that the reduction gear must be both compact and efficient and a popular prior art reduction gear installation is located within the engine air inlet housing. That is, the air inlet housing surrounds the gear case, and therefore to maintain a minimum diameter of the air inlet housing, a small over-all diameter for the transmission is desirable, and further, since the engine will require an air inlet housing in any case, the same structure can be used to house the reduction gear if such reduction gear is kept small enough in over-all dimensions, thus providing a minimum frontal area requirement for the air frame design. In addition, the smaller inlet housing diameter will provide a lighter weight housing and will offer the best compromise for engine air inlet passage efficiency.

The types of gearing commonly used in prior art applications for turboprop gear reductions are (1) nonplanetary arrangements which carry a major weight handicap in the 15 to 1 reduction ratio range, (2) single stage planetary transmission which, although it provides a high efficiency, the compact transmission advantage is not maintained much above 12½ to 1 and in the higher ratios is not too satisfactory, (3) two-stage planetary arrangements of the conventional type require transmission of the load through the two stages in series, and therefore the loads imposed are relatively large and advantage of compactness and weight reduction were not fully realized.

A primary object of the so-called split-power gear reduction of this application is an improved two-stage arrangement which provides for reduction in horsepower carried by the second, or low speed, stage of the transmission in a so-called parallel drive relationship so that only a portion of the total transmitted power is directed through the second, or low speed, stage of the transmission with a consequent reduction in both tooth loading and in power losses due to transmission inefficiencies in the secondary stage.

It is a further object to provide a gear reduction accomplishing the desired results but with a mounting facility of desired location of propeller shaft bearings, i.e., with sufficient spacing between the propeller shaft support bearings.

It is a further object to provide desired gear reduction in an assembly which does not change the universally accepted directions of rotation between the power turbine and the propeller.

It is a further object to provide a gear reduction which will be of over-all diameter such as to provide a minimum of interference with air inlet to the engine with consideration for minimum frontal area exposed to thereby minimize the air resistance of the engine assembly when assembled to the aircraft.

It is a further object to provide a turboprop reduction gear of light, compact, high-efficiency characteristics while still maintaining the desired step-down in gear ratio of approximately 15 to 1 or higher.

Other objects will be apparent on detailed description of a specific embodiment of the invention here selected for illustration and as shown by the accompanying drawings forming a part hereof and wherein:

FIGURE 3 is a section taken on the line 3—3 of FIG. 1 and is also a section through the primary stage as in FIG. 2, but is taken through the bearing housing for the intermediate gears, the outer housing likewise not being shown in this view.

FIGURE 4 is a section taken on the line 4—4 of FIG. 1 through the central gear, intermediate gears and ring gears of the secondary stage.

FIGURE 5 is a section on the line 5—5 of FIG. 1 and is a section through the bearing housing for the secondary stage showing the mounting for the bearing support to secure the intermediate gear mounting to the casing.

Figure 1:
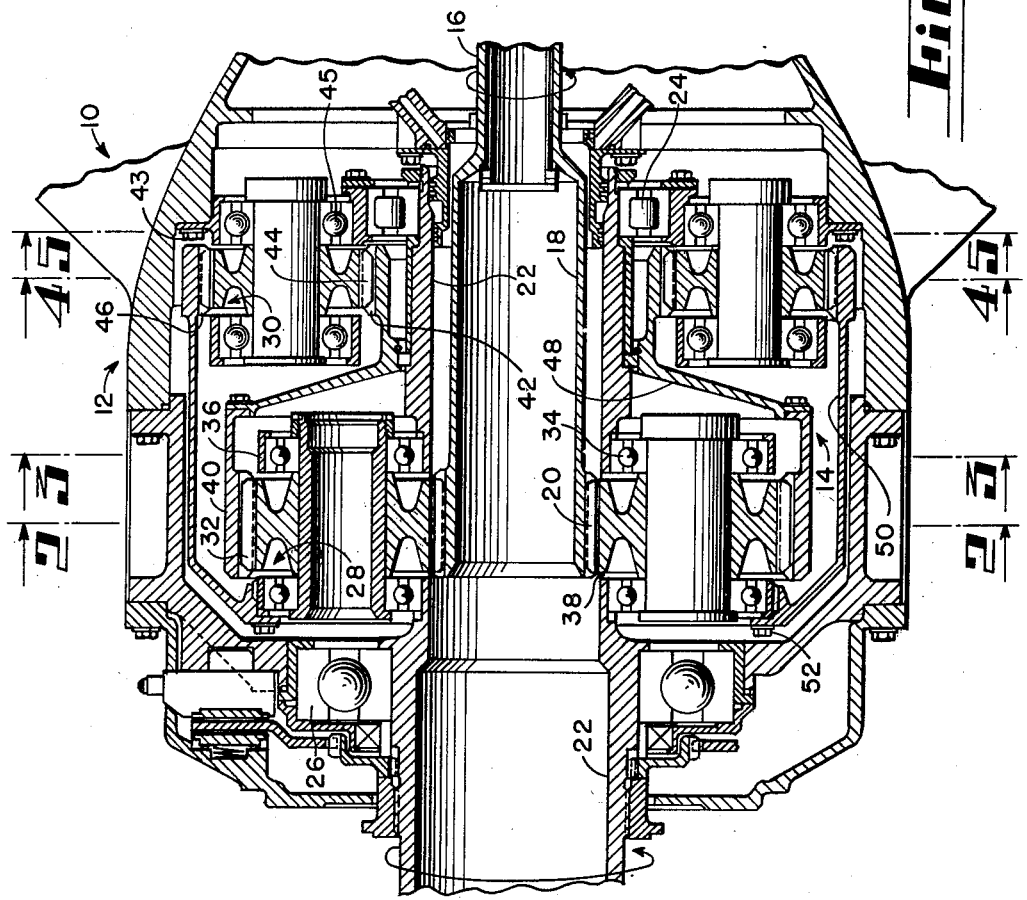
FIGURE 1 is a longitudinal sectional view of a two-stage gear-set split power reduction gear of this invention.
Figure 1:
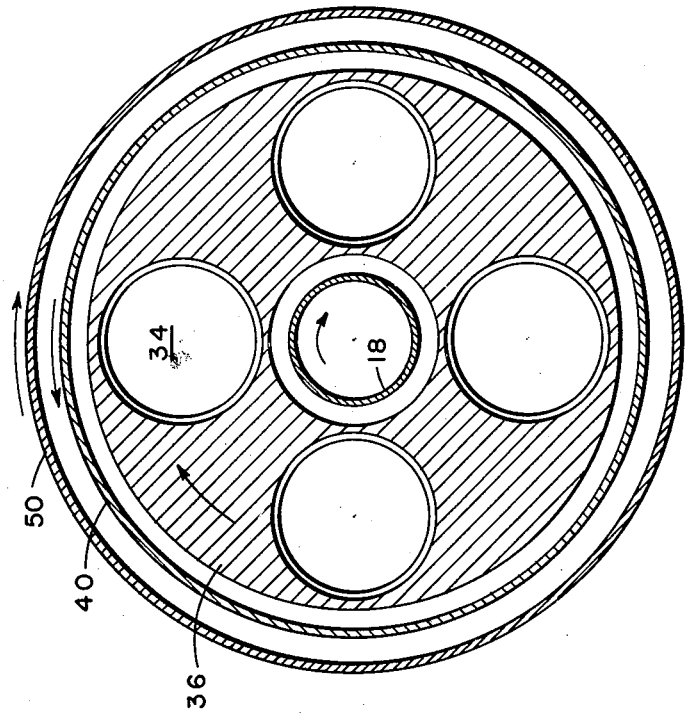

Referring to the drawings of an illustrative structure, a gas turbine engine front end assembly 10 houses in its forward gear casing 12 a gear reduction assembly 14 which is the two-stage split-power gear-set gear reduction of this invention. A high speed input shaft 16 is here shown as the shaft receiving the drive from a power turbine, not shown, which rotates at relatively high r.p.m.'s in the range of 12,000 to 30,000, and this input shaft 16 has a rotatable drive connection shaft portion 18 with a central gear 20 integral therewith. The output shaft 22 is hollow and extends from a rear bearing 24 to a forward bearing 26, both bearings 24 and 26 surround the hollow shaft 22 while the previously-mentioned shaft 16—18 and the integral central gear 20 are inside the hollow shaft 22. The output hollow shaft 22 is forwardly extending and is the low speed of rotation output of the gear reduction assembly to a propeller.

Figure 2:
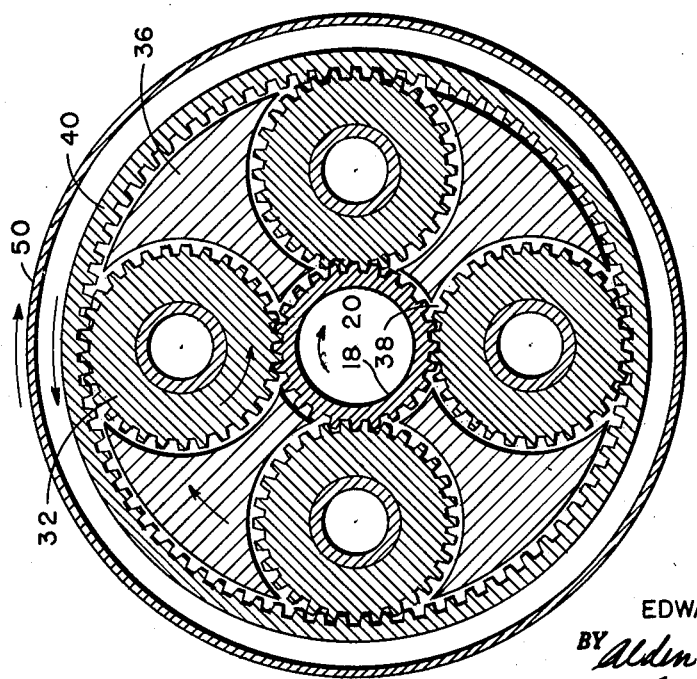
FIGURE 2 is a section on the line 2—2 of FIG. 1 taken through the primary central, intermediate, and ring gears and the cylindrical connection between the secondary and primary stage which surrounds the gear unit, the outer housing and casing not being shown.

Surrounding the output shaft 22, and positioned between the bearings 24 and 26, are two gear-sets or gear reduction stages, i.e., a primary planetary gear-set stage 28 and secondary gear-set stage 30. Considering the primary planetary gear-set stage 28, the central or sun gear for this stage is the previously-mentioned central gear 20 which is driven in rotation at high speed input rotation from the power source by the shaft 16 and its drive connection portion 18. This central or sun gear meshes with a plurality of intermediate or planet gears 32. These intermediate gears are supported on carrier bearings 34 which are in turn supported on a carrier integral support section 36. This carrier support section 36 is an enlarged portion of the output shaft 22 and is formed from a substantially cylindrical enlarged portion of the shaft 22 with machined openings to receive the plurality of intermediate or planet gears 32 as shown in the drawings (FIGURE 2) and to support the planet bearings 34.

The intermediate or planet gears 32 extend through circumferentially spaced radial openings 38 in the shaft 22 from the carrier integral support portion 36 of the shaft 22, previously mentioned, so that the central or sun gear 20 rotates the intermediate or planet gears 32 through the tooth contact made with the intermediate gears through the spaced radial openings 38. The primary stage is also provided with a ring gear 40 which is an internal ring gear extending circumferentially around the outer portion of the primary stage and meshing with the intermediate planet gears 32. Thus, the central sun gear 20 rotates the intermediate planet gears 32 and the intermediate planet gears 32 mesh with the ring gear 40 in the assembly, as shown. There is also provided a secondary gear-set stage 30, as previously mentioned. This gear set 30 is not a true planetary as its carrier is stationary as will later appear. This gear-set stage 30 also is made up of a central gear 42, a plurality of intermediate gears 44 and an outer internal ring gear 46. A drive connection 48 is provided between the primary stage ring gear 40 and the secondary stage central gear 42, and a further drive connection 50 in the form of a cylindrical member surrounding the primary stage 28 connects the secondary stage ring gear 46 with the integral carrier support section 36 and thus to the output shaft 22 forwardly of the primary stage 28 by means of the connection 52, as shown.

In operation the drive comes from the power source through the previously-mentioned shaft 16 which rotates the central gear 20 and the intermediate planet gears 32 and thus causes a portion of the drive to be taken directly through the primary planetary gear-set stage 28 by virtue of the precession of the primary intermediate planet gears 32. The power is split, however, as another portion of the power is put through the secondary gear-set stage 30 by means of the rotative retarding contact afforded between the intermediate planet gears 32 and the ring gear 40, and the drive connection 48 to the central gear 42 of the secondary gear-set stage. The secondary stage intermediate gears 44 with bearings 45 and carrier 43 fixed to the casing 12, results in a stationary carrier for the second stage. The fact that the secondary carrier 43 is fixed renders the secondary stage 30 as non-planetary. Rotation is imparted to the ring gear 46 of the secondary gear-set stage 30 through central gear 42 and intermediate gears 44. The drive connection 50 connects this portion of the drive with the shaft 22, the connection being to the integral carrier support 36 which is integral with the shaft 22, the actual connection being at 52. It is thus apparent that the power is "split," as only a portion of the power goes directly through the primary stage carrier to its integral shaft 22 and the remainder goes through the secondary stage to the shaft 22, and the tooth loads imposed in the two stages 28, 30 are, so to speak, "in parallel," and the secondary stage loads on the parts thus imposed are less than by a series arrangement. The advantage gained is a substantial reduction in size and weight of the parts required and reduced power losses due to inefficiencies.

It has been previously mentioned that the high speed input shaft 16—18 is directly connected, and is in fact integral, with the central gear 20 of the primary stage, while the low speed output shaft 22 is a part of, and rotates with, the intermediate carrier 36 of the primary stage. The ring gear 40 of the primary stage, which surrounds and meshes with the intermediate gears 32, rotates in a direction opposite in sense to the input shaft 16 and this portion of the so-called "split" drive is carried to the central gear 42 of the secondary stage 30 and goes through the gear reduction afforded by the intermediate gears 44 and the surrounding ring gear 46 of the secondary stage 30. This portion of the drive from the ring gear 46 goes through the drive connection 50 which surrounds the primary stage back to the output shaft 22 without going through the primary stage gearing, thus affording a split in the transmission forces so that the loads, and consequently the size and weight of the parts, are reduced over what would be required if the two-stage gear-set arrangement were connected in series instead of in the parallel relationship as here set forth.

With the transmission gears having approximately the relative sizes illustrated and assuming te rotative speed of the high speed shaft 16 to be unity, the following are the approximate rotative speeds of the other components of the transmission:

| | |
|---|---|
| Primary central gear 20 | 1.00 |
| Primary intermediate gear 32 | −0.62 |
| Primary ring gear 40 | −0.16 |
| Primary carrier 36 and output 22 | 0.07 |
| Secondary central gear 42 | −0.16 |
| Secondary intermediate gear 44 | 0.23 |
| Secondary ring gear 46 | 0.07 |
| Secondary carrier 43 | 0 |

Minus sign (—) indicates direction of rotation reversed relative to shaft 16.

With the transmission gears having approximately the relative sizes illustrated, the power split would be approximately 34% of the total power transmitted directly by the primary stage; and approximately 66% of the total power delivered through the secondary stage.

Although the invention has been described by reference to a specific illustrative structure, it is understood that various modifications are intended and are possible without departing from the fundamental principles herein set forth and within the scope of the following claims.

I claim:

1. In a multi-stage split power gear-set gear reduction, a hollow output low speed shaft, spaced bearings supporting said low speed shaft, an input high speed shaft extending into and surrounded by said hollow low speed shaft, a primary and a secondary gear-set stage both surrounding said output low speed shaft and positioned between said spaced bearings, each stage comprising: a central gear, a ring gear, and a plurality of intermediate gears connecting said central gear and said ring gear and including a carrier for said intermediate gears, a drive connection mounting said primary stage central gear for rotation with said input high speed shaft, a primary stage carrier mounting secured for rotation with said output low speed shaft, a positive rotative connection between said primary stage ring gear and said secondary stage central gear, a stationary support for said secondary stage carrier, and a positive rotative connection between said secondary stage ring gear and said output low speed shaft.

2. In a multi-stage split power gear-set gear reduction, a hollow output low speed shaft, an input high speed shaft inside the hollow low speed shaft, a primary and a secondary gear-set stage both surrounding said output shaft, each stage comprising: a central gear, a ring gear, and a plurality of intermediate gears connecting said central gear and said ring gear and including a carrier for said intermediate gears, a drive connection mounting said primary stage central gear for rotation with said input high speed shaft and effecting meshing gear connection with said primary stage intermediate gears through spaced radial openings in said output shaft, a primary stage carrier mounting integral with and secured for rotation with said output low speed shaft, a positive rotative connection between said primary stage ring gear and said secondary stage central gear, a stationary support for said secondary stage carrier, and a positive rotative connection between said secondary stage ring gear and said output low speed shaft.

3. In a two-stage split power gear-set gear reduction as in claim 2 in which the gear reduction is from a rearward positioned high speed rotation power source to a forward reduced rotation output, and in which the output low speed shaft is hollow and forwardly extending with spaced front and rear bearings supporting and surrounding said hollow output shaft, said primary stage being positioned forwardly of said secondary stage, said high speed input shaft extending from the rearward positioned power source forward into the hollow portion of said output low speed shaft and with said primary stage central gear carried by said high speed shaft contacting said intermediate gears of said primary gear-set stage through circumferentially spaced radial openings in said hollow output shaft.

4. In a two-stage split power gear-set gear reduction from a rearward positioned high speed rotation power source to a forward reduced rotation output, a hollow forwardly extending output low speed shaft, spaced front and rear bearings supporting and surrounding said hollow output shaft, an input high speed shaft extending from the rearward positioned power source forward into the hollow portion of said output low speed shaft, a primary and a secondary gear-set stage positioned between said bearings and surrounding said shafts, said primary stage forward of said secondary stage, each stage comprising: a central gear, a ring gear, and a plurality of intermediate gears connecting a central gear with a ring gear with a carrier for said intermediate gears; a mounting for said primary stage carrier formed integral with said output low speed shaft positioned between said spaced bearings but adjacent said front bearing and affording circumferentially spaced radial openings from the hollow portion of said output low speed shaft, a drive connection for said primary stage central gear for rotation of said central gear by said input high speed shaft, said primary stage central gear contacting said primary stage intermediate gears through said circumferentially spaced radial openings in said hollow output low speed shaft, a stationary support for the secondary stage carrier, a drive connection between said primary stage ring gear and said secondary stage central gear, and a drive connection between said secondary stage ring gear and said output low speed shaft extending around said primary stage to connect to said output shaft forward of said primary stage.

5. In a two-stage split power gear-set gear reduction from a rearward positioned high speed rotation power source to a forward reduced rotation output, a hollow forwardly extending output low speed shaft, spaced front and rear bearings supporting and surrounding said hollow output shaft, an input high speed shaft extending from the rearward positioned power source forward into the hollow portion of said output low speed shaft; a primary and a secondary gear-set stage positioned between said bearings and surrounding said shafts, said primary stage forward of said secondary stage, each stage comprising: a central gear, a ring gear, and a plurality of intermediate gears connecting a central gear with a ring gear with a carrier for said intermediate gears; a mounting for said primary stage carrier formed integral with said output low speed shaft, a drive connection for said primary stage central gear inside said hollow output low speed shaft for rotation of said primary stage central gear by said input high speed shaft and meshing with said primary stage intermediate gears through openings in said hollow shaft, a stationary support for said secondary stage carrier, a drive connection between said primary stage ring gear and said secondary central gear, and a drive connection between said secondary ring gear and said primary stage carrier mounting.

6. In a multi-stage split-power gear set gear reduction between an input high speed shaft and an output low speed shaft:
 a primary and a secondary gear set stage each with a central gear, intermediate gears, a carrier, and a ring gear;
 said primary gear set stage carrier being planetary and connected to rotate with said output low speed shaft;
 said secondary gear set stage having a fixed carrier;
 such primary and secondary gear set stage split-power arrangement employing a positive drive connection between said primary stage ring gear and said secondary stage central gear;
 and also employing a positive drive connection between said secondary stage ring gear and said output low speed shaft;
 said secondary stage rearwardly positioned relative to said primary stage and said high speed input shaft extending from a rearward positioned power source forward into a hollow portion of said output low speed shaft and with said primary stage central gear carried in rotation by said high speed input shaft.

7. In a multi-stage split power gear-set gear reduction:
 an input high speed shaft;
 an output low speed shaft;
 spaced bearings supporting said low speed shaft;
 a primary and a secondary gear-set stage both surrounding said output low speed shaft;
 at least said primary gear-set stage positioned between said spaced bearings;
 each stage comprising: a central gear, a ring gear, and a plurality of intermediate gears connecting said central gear and said ring gear and including a carrier for said intermediate gears;
 a drive connection mounting said primary stage central gear for rotation with said input high speed shaft;
 a primary stage carrier mounting secured for rotation with said output low speed shaft;
 a rotative connection between said primary stage ring gear and said secondary stage central gear;
 a stationary support for said secondary stage carrier;
 and a rotative connection between said secondary stage ring gear and said output low speed shaft.

References Cited in the file of this patent

UNITED STATES PATENTS

| | | |
|---|---|---|
| 1,320,530 | Buehler | Nov. 4, 1919 |
| 2,488,660 | Conkle | Nov. 22, 1949 |

FOREIGN PATENTS

| | | |
|---|---|---|
| 323,216 | Switzerland | July 15, 1957 |